J. LAUTH.
Thill-Coupling.
No. 217,696.  Patented July 22, 1879.
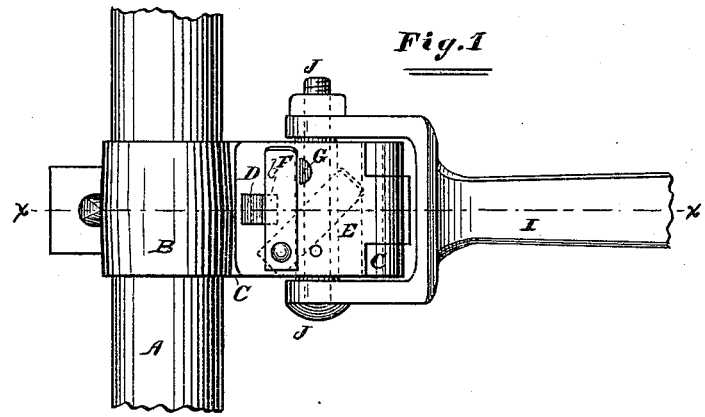
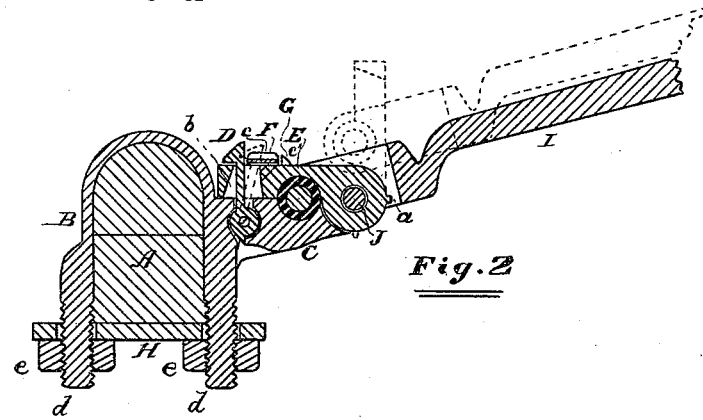
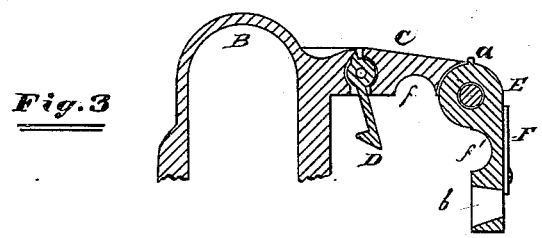
Attest:
James H. Coyne
S. S. Schoff
Inventor:
Jacob Lauth
By F. F. Warner his
Attorney.

UNITED STATES PATENT OFFICE.

JACOB LAUTH, OF CHICAGO, ILLINOIS.

IMPROVEMENT IN THILL-COUPLINGS.

Specification forming part of Letters Patent No. 217,696, dated July 22, 1879; application filed December 3, 1878.

*To all whom it may concern:*

Be it known that I, JACOB LAUTH, of Chicago, in the county of Cook and State of Illinois, have invented certain new and useful Improvements in Thill-Couplings, of which the following, in connection with the accompanying drawings, is a specification.

In the drawings, Figure 1 is a top or plan view of a coupling embodying my invention; Fig. 2, a section in the plane of the line $x\ x$, Fig. 1; and Fig. 3, a like representation, showing a modification in the arrangement of some of the parts.

Like letters of reference indicate like parts.

A represents the axle, and B is a clip. C is a bracket or leaf made continuous, or in one and the same part or piece, with the said clip, and extending forward therefrom, as shown. D is a vertical hook or catch pivoted in the rear part of the bracket C, and allowed to vibrate back and forth to some extent on its pivot or pintle. E is a leaf hinged at its forward end to the forward end of the bracket C, and folding back upon the latter. $a$ is a stop-rib on the leaf E. This rib is arranged to strike the forward part of the bracket C when the leaf E is raised to a vertical position, thereby preventing the leaf E from being carried farther forward, as represented by the broken lines in Fig. 2. The rear part of the leaf E is slotted, as shown at $b$, to receive the hook D, which passes through the said slot, and the latter is sufficiently large to allow the hook to play back and forth therein to a little greater extent than the length or projection of the shoulder on the free end of the hook.

F is a spring-catch or yielding latch pivoted to the rear part of the leaf E, and extending across the same, as shown. G is a stop or short projection extending from the upper face of the leaf E. The hook D, latch F, and stop G are so arranged with relation to each other and the slotted leaf E and bracket C that the hook will be held to engage this leaf when the catch is arranged between the stop G and the hook, as indicated by the full lines in Fig. 1.

It will be perceived that the leaf E will be firmly locked down upon the bracket C when the locking parts are arranged as above described. It will also be perceived that the leaf E may be easily unlocked and raised by raising the latch F and swinging it forward or away from the engaging shoulder formed by the stop G, as represented by the broken lines in Fig. 1.

To facilitate the act of moving the latch F back and forth in this manner, I deem it preferable to turn up the free end of the latch slightly, and to bevel the forward part of the stop G, as shown at $c$ and $c'$, respectively. The lower ends of the clip B terminate in screws $d\ d$, in connection with which I employ the clamping-plate H and the nuts $e\ e$ to secure the coupling to the axle.

I is the thill-iron or strap, the rear end of which is forked, as shown. J is a pin or bolt passing across the forked end of the iron I. This pin may be covered with rubber or other packing to prevent rattling.

Semicircular grooves $f\ f'$ are made in the interior faces of the bracket C and leaf E, respectively, to receive the bolt or pin J.

It will be perceived that when the pin J is applied to the iron I and arranged in the grooves $f\ f'$, and the leaf E is locked down in the manner described, the thills will be securely coupled to the clip. It will also be perceived that the thills will not be liable to become wholly detached from the coupling even if the leaf E becomes accidentally loose or raised, for this leaf, being then held vertically by the rib $a$, and being grooved to receive the pin J, will still serve to prevent the thills from being drawn entirely away. The rib $a$ is merely auxiliary to other features of my invention in making the clip secure in case of accident to other parts; but as the coupling is operative to a useful degree without the rib $a$, the latter need not be employed except for the purpose already set forth.

I do not here intend to be restricted to the clip and bracket when made in one piece, nor to the precise form of thill-iron here shown, the chief feature of my invention being the means employed to lock the leaf E against the bracket C.

It will be perceived that the thills may be very easily coupled and uncoupled, and that it is immaterial whether the leaf E lies against the upper or the lower face of the bracket C.

Having thus described my invention, what I claim as new, and desire to secure by Letters Patent, is—

1. The combination of the bracket C, the hook D, pivoted to the said bracket, the leaf E, hinged to the said bracket and having therein the slot $b$, the rigid stop G on the said leaf, and the spring catch or latch F, pivoted to the said leaf, all arranged substantially as specified with relation to each other, for the purposes specified.

2. The grooved leaf E, provided with the stop $a$, and hinged at its forward end to the grooved bracket C of a thill-coupling, the said stop being arranged substantially as described with relation to the said leaf and bracket, in connection with means for locking the said leaf at its unhinged end to the said bracket, for the purposes set forth.

3. In combination, the grooved bracket C, the grooved and slotted leaf E, having thereon the stop $a$ and the stop G, the pivoted and yielding latch F, the pivoted hook D, and a clip for connecting the said parts to the axle, substantially as and for the purposes specified.

JACOB LAUTH.

Witnesses:
F. F. WARNER,
S. S. SCHOFF.